United States Patent [19]

Parlant

[11] Patent Number: 4,747,084

[45] Date of Patent: May 24, 1988

[54] ENERGY GENERATORS INITIATED BY SEA WATER FOR ACOUSTIC BUOYS AND ACOUSTIC BUOYS EQUIPPED WITH SUCH GENERATORS

[75] Inventor: James Parlant, Ruelle, France

[73] Assignee: ETAT Francais, France

[21] Appl. No.: 910,673

[22] Filed: Sep. 23, 1986

[30] Foreign Application Priority Data

Oct. 10, 1985 [FR] France ................................ 85 15006

[51] Int. Cl.[4] ................................................ H04B 1/59

[52] U.S. Cl. ........................................... 367/3; 367/4; 114/326; 441/18

[58] Field of Search ................... 367/3, 4; 441/18, 30, 441/31; 114/326; 429/119

[56] References Cited

U.S. PATENT DOCUMENTS

| | | | |
|---|---|---|---|
| 2,839,920 | 6/1958 | MacAnespie | 367/3 |
| 3,444,508 | 5/1969 | Granfors et al. | 367/3 |
| 4,093,934 | 6/1978 | Urick et al. | 367/3 |

*Primary Examiner*—Thomas H. Tarcza
*Assistant Examiner*—Daniel T. Pihulis
*Attorney, Agent, or Firm*—Parkhurst & Oliff

[57] ABSTRACT

An energy generator of a Sonobuoy is overlapped by a sleeve or chimney guiding gas bubbles given off by the generator to a sufficient distance from an electro-acoustic transducer of the Sonobuoy, to prevent such bubbles from coming into contact with the transducer under heaving effects. The result is suppression of unwanted noise produced by the contact between the bubbles and the transducer.

9 Claims, 2 Drawing Sheets

ENERGY GENERATORS INITIATED BY SEA WATER FOR ACOUSTIC BUOYS AND ACOUSTIC BUOYS EQUIPPED WITH SUCH GENERATORS

BACKGROUND OF THE INVENTION

The present invention relates specifically to acoustic buoys used for the detection of submarines and is more specifically aimed at improvements made to energy generators initiated by sea water, powering these buoys with electricity.

Sonobuoys, of the character known in the prior art, are generally dropped from an aircraft and include, in their utilization position, a floatation member, filled during the aerial drop of the Sonobuoy, or on impact on the water.

This flotation member supports a sealed compartment containing the electronics for buoy-aircraft linkage, from which an electro-carrier cable leads out, supporting a load immersed to a depth selected before the drop (50 or 150 m for instance).

The load consists of a sonar comprising an electro-acoustic transducer and the associated electronics (transmitter and receiver for active sonar).

The sonar is supplied with electric power by a generator or an ignitable battery, with sea water used as electrolyte.

For some Sonobuoys of the character known in the prior art, the generator is arranged on the flotation member, and the electric energy is transmitted to the sonar via the electro-carrier cable.

To facilitate assembly, maintenance and wiring of the buoy, it is proposed to house the ignitable generator near the sonar at the cable end and, more specifically, to attach said generator directly to the electro-acoustic transducer.

However, although this solution offers the desired simplification advantages, it is evident that it does lead to unexpected drawbacks in some operating conditions. Indeed, during the operation of a Sonobuoy arranged according to said solution, the presence of interference noise has been noted, disturbing operation of the Sonobuoy and preventing satisfactory processing in the aircraft of the sonar signals transmitted by the buoy. The origin of this interference noise was difficult to discover but finally, it was recognized that the interference noise was generated when the electro-acoustic transducer of the buoy came into contact with bubbles emitted by the energy generator.

Indeed, the type of ignitable battery used in this application is a high power generator in terms of mass and volume (for instance 700 W per liter), in which chemical reaction leads to the giving off of substantial amounts of gases which escape from the battery into the sea water in the form of a multitude of bubbles.

In rough seas, the transducer and battery ascend and descend (heaving motion), so that the ascentional speed of the transducer in some cases exceeds the ascential speed of the bubbles. This means that the transducer catches up with the bubbles, so that, when they come into contact with it, intereference signals are generated.

SUMMARY OF THE INVENTION

The purpose of this invention is to remedy this drawback and to provide a design of Sonobuoys in which the generator is affixed to the transducer and is therefore free of the aforementioned fault of the production of unwanted noise.

The purpose of the invention is to make improvements to sea water initiated energy generators for Sonobuoys with said improvements including a sleeve or chimney covering the upper part of the generator, through which the gases are given off from the generator, guiding the bubbles produced away from the electronic transducer of the buoy.

In a preferred embodiment the transducer is affixed directly to the generator, below, it, and the sleeve oriented vertically with its open upper end placed at a vertical distance from the transducer, sufficient to prevent any contact between the bubbles given off through said end and the transducer; this sleeve serves to evacuate bubbles beyond the volume covered by the transducer under the effect of heaving due to the waves.

Advantageously, the sleeve height is approximately 1.3 meters above the generator and is made of watertight fabric.

Preferably, holes will be pierced in the sleeve at the base, near the water exits of the ignitable battery, whereby the water, charged with waste due to the chemical reaction of the battery, is evacuated and replaced by clean water.

Another purpose of the invention is that acoustic buoys be equipped with an energy generator of this type.

The invention will be more clearly understood by referral to the detailed description which follows and the examination of the attached drawings which represent, as non-limitative examples, several methods of invention design.

DETAILED DESCRIPTION OF THE PREFERRED EMBODIMENTS

Figure 1:
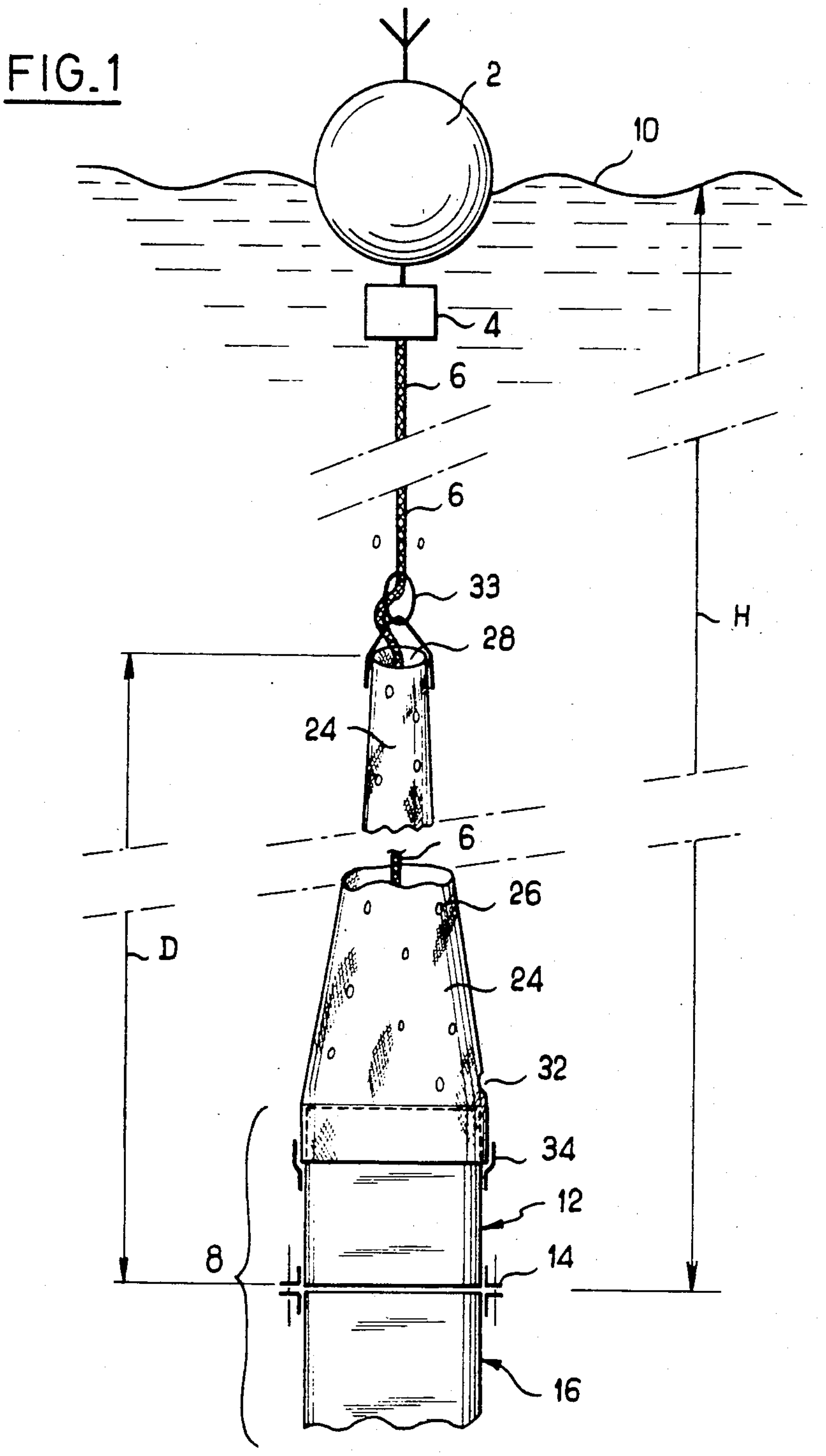
FIG. 1 is a general view of the Sonobuoy according to the invention.

The active Sonobuoy assembly shown schematically in FIG. 1 includes a floating device 2 supporting a sealed compartment 4, forming the electronic system linking the Sonobuoy and an aircraft monitoring the sector.

From compartment 4, an electro-carrier cable 6 leads out, supporting a load 8 immersed at a depth H below level 10 of the sea (for instance 50 to 150 m), selected before jettison of the Sonobuoy by the aircraft.

Figure 2:
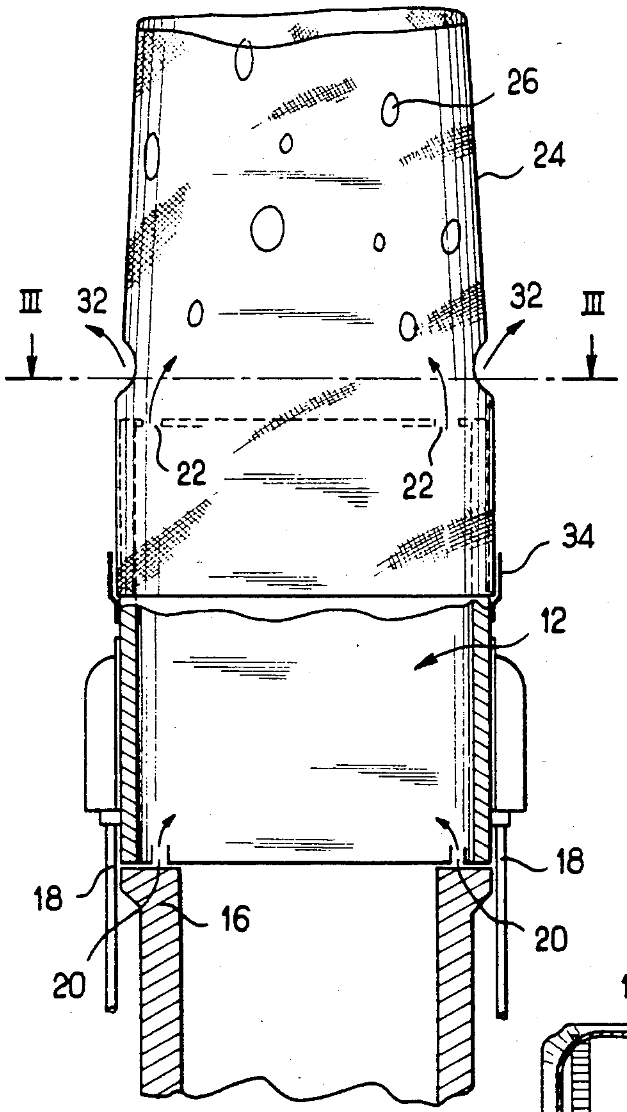
FIG. 2 is a partial view showing the attachment of the sleeve to the generator.

Load 8 includes electric energy generator 12, comprising a sea water initiated battery, in the lower part of which is attached, for instance by means of lugs 14 or a bracket, active sonar transducer 16 of the Sonobuoy, with the associated electronics apparatus (transmitter and receiver). In this way, the sonar is powered directly through short connections 18 by generator 12, as shown in FIG. 2.

Figure 3:
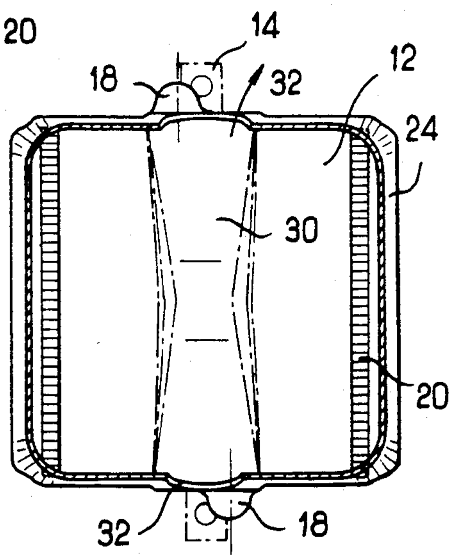
FIG. 3 is a sectional view along line III—III of FIG. 2.

In accordance with the character known regarding sea water initiated batteries, generator 12 includes in its lower section, ports 20 for water inlet (FIG. 3), and in the upper section, ports 22 for the exhaust of the gases produced by the operating battery. According to the invention, generator 12 is overlapped by a sleeve or chimney 24 of watertight fabric, more or less truncated in shape, guiding and confining gas bubbles 26 to allow them to escape only through the open upper end 28 of the sleeve at a distance D from transducer 16, sufficient so that such bubbles cannot come into contact with the transducer in any circumstances.

By means of this sleeve, spurious noise given off by the transducer bonnets encountering the gas bubbles are also suppressed.

It has been determined that the useful height D of sleeve 24 should be at least 1 meter, and preferably between 1.3 meter and 1.5 meter, so that the transducer does not catch up with the bubbles exhausted from the sleeve during the descent of the transducer under the heaving effect caused by 4 meter high waves on the flotation element.

Indeed, the ascentional speed of the bubbles given off by the generator is only approximately 2 meters per second, whereas the ascentional speed of the transducer can achieve 2.67 meters per second for 4 meter waves with a period of 3 seconds.

Therefore, the ejection of bubbles through the upper opening 28 of sleeve must be sufficiently high for the bubbles not to encounter the transducer, and testing has shown that a 1.30 meter sleeve satisfies such conditions. In a preferred embodiment of the invention, it is considered that the lower part of sleeve 24 near the water outlets 30 of generator 12, ports 32 (see FIG. 3), for instance circular ports, be provided to avoid the confinement of the water held within the sleeve above the generator and for the evacuation of the Sonobuoys, improving the operation of the generator. Under the combined effect of heaving and the heating of the water at the top of the stack, the water, charged with waste due to chemical reaction of the battery, is exhausted upward and renewed by clean water. In this way, the return of water containing waste to the battery is avoided, a situation otherwise liable to degrade operation and cause a drop in voltage.

In order to maintain it in a vertical position at all times, sleeve 24 is attached at the upper part of electro-carrier cable 6, preferably by a deformable ring 33 forming a damper. Cable 6 then runs inside the sleeve and is connected to the transducer. A supplementary line of cord (not shown) may be provided within the sleeve, parallel to electro-carrier cable 6, to ensure mechanical support of the sonar.

The lower part of the sleeve is slipped tight over generator 12, on which it can be attached by a piece of adhesive tape 34.

Naturally, before jettison, the sleeve is carefully folded against the generator to ensure the easy deployment of the sleeve when the Sonobuoy is launched.

The sleeve, more or less conical in form, from top to bottom, can have a diameter included between approximately 70 mm and approximately 45 mm at the top end. The sleeve is made of watertight fabric, so that very small bubbles cannot pass through it and reform to produce larger bubbles which could disturb the transducer.

As is readily seen, the invention is not limited in any way to the design modes of the example described and shown and is likely to incorporate many variants accessible to the man of the art, depending on the applications in view, but without deviating from the overall framework of the invention.

In this way, it might be possible to connect a recipient, for instance a flotation element, to sleeve 24 whereby the gases carried through the sleeve could serve to inflate said recipient.

I claim:

1. A sea water initiated energy generator for a sonobuoy comprising a bubble guide sleeve for directing gas bubbles originating from a chemical reaction of the generator, said bubble guide sleeve having a lower part overlapping an upper part of the generator acting as a hood thereover, and an open end through which said bubbles escape, said open end being spaced a distance from a transducer of the sonobuoy sonar.

2. A generator according to claim 1, wherein said transducer is affixed directly beneath said generator and said sleeve is oriented vertically above said generator.

3. A generator according to claim 1, wherein the sleeve is of watertight fabric and is truncated in shape with the smallest section at the open upper end of the sleeve.

4. A generator according to claim 3, wherein said sleeve is attached at an upper section thereof to an electro-carrier cable which connects a detector assembly of the sonobuoy to a float.

5. A generator according to claim 4, wherein said sleeve has a height D of at least one meter.

6. A generator according to claim 5, wherein said sleeve is pierced with holes allowing waste produced by the generator to escape, said holes being located in the lower part of the sleeve near generator water outlets.

7. A generator according to claim 5, wherein said height D is 1.3 meters.

8. A sonobuoy generator combination for the detection of submarines, wherein said combination includes a sea water initiated energy generator according to claim 6.

9. The combination according to claim 8, wherein a recipient is connected to said sleeve, whereby the gases given off by the sleeve can be used to inflate said recipient to act as a float.

* * * * *